United States Patent [19]
Kudirka et al.

[11] Patent Number: 5,893,064
[45] Date of Patent: Apr. 6, 1999

[54] SPEECH RECOGNITION METHOD AND APPARATUS WITH VOICE COMMANDS AND ASSOCIATED KEYSTROKES

[75] Inventors: James Kudirka; Thomas Kudirka; Phil Maltby, all of Tulsa, Okla.

[73] Assignee: K2 Interactive LLC, Tulsa, Okla.

[21] Appl. No.: 856,380

[22] Filed: May 14, 1997

[51] Int. Cl.$^6$ .................................................. G10L 3/00
[52] U.S. Cl. ..................... 704/275; 345/168; 704/231
[58] Field of Search .................................... 704/275, 270, 704/251, 243, 231; 273/148 B; 345/172, 168; 364/709.09, 709.1, 709.11, 709.13, 709.14

[56] References Cited

U.S. PATENT DOCUMENTS

| | | | |
|---|---|---|---|
| 4,776,017 | 10/1988 | Hansen | 704/275 |
| 4,799,144 | 1/1989 | Parruck et al. | 235/435 |
| 5,034,598 | 7/1991 | Poland | 364/709.04 |
| 5,353,377 | 10/1994 | Kuroda et al. | 704/256 |
| 5,396,267 | 3/1995 | Bouton | 345/168 |
| 5,426,450 | 6/1995 | Drumm | 345/168 |
| 5,659,665 | 8/1997 | Whelpley, Jr. | 704/275 |

OTHER PUBLICATIONS

"Microsoft Press Computer Dictionary," Microsoft Press, 1994, pp. 81, 214, 222–223, 273–274, 290,309,344.
Harry Newton, "Newton's Telecom Dictionary," Flatiron Publishing, Mar. 1998, pp. 166,388, 530–531, 619–620, and 761.

"Verbal Commander," relcom.games newsgroup, May 28, 1996.

*Primary Examiner*—David R. Hudspeth
*Assistant Examiner*—Donald L. Storm
*Attorney, Agent, or Firm*—Frommer, Lawrence & Haug LLP; Thomas J. Kowalski; I. Marc Asperas

[57] ABSTRACT

Speech recognition is provided which is operable with a host computer having a keyboard. An electrical circuit inclusive of the speech recognition is incorporation into the host computer. A first electrical connector communicates between the electrical circuit and the computer and a second electrical connector communicates between the electrical circuit and the keyboard. A microphone inputs voice commands to the electrical circuit and a software application installed in the host computer configures and trains the voice commands with corresponding key-press information. A microcontroller controls the transmission of the voice commands to the host computer while the electrical circuit includes a switch for allowing the microcontroller to send the key-press information to the host computer via the first electrical connector such that the key-press information is communicated separately from the voice commands communicated to the host computer. In a preferred embodiment, another electrical connector is provided for communicating between the electrical circuit and another port of the computer. The foregoing is also applicable to an internal circuit board installed into the computer. In still another embodiment, the key-press entry is communicated separately from pre-loaded commands sent from the computer.

21 Claims, 14 Drawing Sheets

SPEECH RECOGNITION METHOD AND APPARATUS WITH VOICE COMMANDS AND ASSOCIATED KEYSTROKES

FIELD OF THE INVENTION

This invention relates to a speech activated control system compatible with personal computers for use with computer interactive games or keystroke driven programs. The system preferably is operable with WINDOWS 95 and DOS based computer games. The system which is comprised of a microcontroller and speech recognition chip packaged as an ISA (Industry Standard Architecture) plug-in circuit board or as an external port interface having switch means, software, and electrical connecting means from the system to the keyboard and from the system to the host computer so that the user can train and test verbal commands with the user's own voice by defining key-presses associated with the spoken command or utilize the pre-loaded command files stored in the software for immediate speech recognition interaction with any game. This flexibility in the training sequence of the system allows the user to both choose the spoken word and associated key-presses that best suit the user's application software.

More particularly, the invention relates to a speech recognition system comprising: at least one internal ISA plug-in circuit board or external COM (communication) port device, or external Parallel port device or universal serial bus device; a keyboard patch cable, an adapter plug, a microphone headset to enhance speech recognition in a noisy environment, a software diskette, and a host computer having a keyboard. The circuit board or external device is comprised of a microcontroller and speech recognition chip having a switch means. The microcontroller 30 and speech recognition chip 35 allows the system to accept verbal commands from the user's voice in any language and in any dialect. The system is self-sufficient and does not require special support and does not need to assign IRQs (Interrupt Request), rather the system is easy to configure, install, and to create, modify and delete verbal commands stored in the software program's files.

A preferred embodiment comprises an ISA plug-in circuit board that connects to a keyboard and a host computer, whereby the ISA plug-in board sends scan codes to the host computer's keyboard port based on speech recognition. This is performed by the microcontroller that is embedded in the plug-in board, which communicates between the speech recognition ASIC (Application-Specific-Integrated Circuit) and the host computer by receiving scan codes, which is the key press data information. The microcontroller performs the disconnecting and reconnecting of the keyboard from the serial data path when sending the scan codes through a switch means, while the software loaded into the host computer sends/receives commands and data to the microcontroller. Alternative embodiments of the system include external COM port, Parallel port and Universal Serial Bus ("USB") interfaces, which operate in the same way as the internal ISA plug-in board, except that the manner in which the data is transferred differs. Rather than using the host computer's data bus, the host computer performs its communication with external devices by way of the serial (RS-232C) (Serial Port), parallel or printer ports. Documents cited herein are incorporated by reference.

BACKGROUND OF THE INVENTION

It is known in the prior art to have voice recognition systems that incorporate a speech synthesizer chip technology, but none of the teachings incorporate the technology of the present invention. Rather, the prior art speech recognition systems are not controlled by the supplied software as in the present invention where personalization of the pre-loaded commands are permitted, but not by function keys or cursor controls connected to the applications program that resides in the computer's RAM memory at all times. Further, the prior art discloses transferring data from the host computer to the speech recognition chip through the keyboard port, while the present invention only sends a key press entry that is assigned to the newly spoken and recorded command to the host computer's keyboard port, with the actual data being sent and received by the host computer's data bus (internal ISA device); the serial port (COM RS-232C device), the parallel port (parallel port device); and the USB port (USB device).

The prior art patents that show systems operating in response to voice commands are as follows:

U.S. Pat. No. 4,677,569 to Nakano et el. is directed towards a computer controlled by voice input, wherein the voice control device is completely incorporated into a host computer so that each keyword corresponding to a start address of a program among a plurality of programs stored in memory can be specified by a voice input by utilizing digital codes formed from complex circuitry involving a computation section, speech recognition start control section, data table of storage contents stored in a program memory, speech synthesis data storage section, and an operator guidance control section. This system does not disclose a microcontroller and a speech recognition chip that connects to a keyboard and a host computer, for sending scan codes to the host computer's keyboard port based on speech recognition and for disconnecting and reconnecting the keyboard from the serial data path by switch means when sending the scan codes, while the software loaded into the host computer sends/receives commands and data through the host computer's data bus.

U.S. Pat. No. 4,704,696 to Reimer et al. relates to a voice control system that controls the execution of a video game by suspending the game during the entire voice input and recognition intervals. This is accomplished by having the microphone outputs connected to either a clipping circuit or a filter having a narrow bandpass filter connected to a peak connector, and then connected to a microprocessor. However, the present speech recognition system does not suspend the game while the voice commands undergo filtering means.

U.S. Pat. No. 4,776,016 to Hansen relates to a voice control system which is designed to be adaptable to existing computers and operated by voice commands. This patent is directed to an external device connected solely between the keyboard and the computer, without any other extraneous connections needed for power supply or any other reasons. The patent is also directed towards having software control the priority switch, which enables the keyboard to have priority over voice entries allowing the keyboard input port to upload and download information so that the keyboard is able to be used when connected into the circuit. However, the disclosure does not allow the user to program the user's own voice commands in any language and sent data through the host computer's data bus as in the present invention.

U.S. Pat. No. 5,353,377 to Kuroda et al. is directed towards a speech recognition system having an interface to a host computer bus for direct access to the host memory for accessing the main memory of the personal computer based on fenonic Markov models. The patent is also related to a system capable of performing real time recognition of a large vocabulary by means of a signal processing card packaged on a bus of a personal computer that uses polling fast match and detailed matching.

Thus, the prior art has failed to provide a simple speech recognition system having either an internal or external device comprised of a microcontroller and speech recognition chip that works in conjunction with a software application stored in the RAM memory of the host computer and sends scan codes to the host computer's keyboard port without using digital codes; filtering means; loading or saving programs through keyboard I/O port; and matching based on fenonic Markov models.

Accordingly, the prior art has failed to provide a speech recognition system which is easy to assemble and to install, which does not require additional circuitry such as speech synthesis means, A/D converters, clipping or digital circuitry, preamplifiers, and interfacing with cursor controls, function keys, or loading/saving programs utilizing keyboard I/O ports. More particularly, the prior art has failed to provide a relatively quick, low cost system with a step-by-step process of configuring verbal commands of the user's own voice by utilizing software loaded in the host computer and communicates with the system's ports that requires no additional support and consumes no system's resources during game play.

OBJECTS AND SUMMARY OF THE INVENTION

An object of the present invention is to provide a novel speech recognition system which is speaker dependent and overcomes problems associated with the prior art.

More specifically, it is an object of the present invention to provide a speech recognition system for computer games that allows the user to program the system with the user's own voice in any language, dialect or accent to initiate and execute commands during game play and allow the user to store such commands for each game, while still providing pre-loaded voice commands upon installation of the system.

Yet another object of the present invention to provide a speech recognition system that is readily adaptable to operate in conjunction with a joystick or any other game controller.

Another object of the present invention is to provide a speech recognition system that increases recognition accuracy by utilizing a noise canceling microphone to cancel out background noise when training and configuring voice commands into the system utilizing the user's voice.

It is still another object of the present invention to provide a relatively low-cost, easy to configure speech recognition system where the user is provided the flexibility of training any word or sound for commands rather than selecting from a narrow list of pre-programmed commands.

A yet further object of the present invention is to provide a speech recognition system readily adaptable to a wide variety of uses outside computer games, such as uses operable with MSWord, EXCEL, ACCESS, INTERNET browser, or with any other keystroke driven applications.

It is yet another object of the present invention to provide a speech recognition system that provides personalization means by programming any keyboard key combination with a voice command so as to control any computer software that utilizes those key combinations by sending scan codes to the host computer's keyboard port.

A still further object of the present invention is to provide a speech recognition system operable with any WINDOWS 95 or DOS applications, which requires no system resources in the form of CPU time, memory, system bus interaction, disk input/output, DMAs (Direct Memory Access/Addressing), or IRQs during the autonomous recognition mode (when the user has speech recognition active).

Another object of the present invention is to provide a speech recognition system that only transfers scan codes to the host computer's keyboard port.

In accordance with an aspect of this invention, there is provided a speech recognition apparatus operable with a host computer having a keyboard comprising: a) an electrical circuit means, having speech recognition means, incorporated into the host computer; b) a first electrical connecting means for communicating between the electrical circuit means and the computer; c) a second electrical connecting means for communicating between the electrical circuit means and the keyboard; d) an optional noise canceling microphone for insertion into electrical circuit means for inputting voice commands to said electrical circuit means; e) a software application for installing in the host computer for configuring and training the voice commands with corresponding key-press information; f) the electrical circuit means further including a microcontroller for controlling transmission of the voice commands to the host computer and for receiving from the host computer the voice commands and the key-press information; and g) the electrical circuit means further including a switch means for allowing the microcontroller to send the key-press information to the host computer. A preferred electrical circuit means is an ISA plug-in circuit board, while the preferred first electrical connecting means for communicating between the electrical circuit means and the computer is a keyboard patch cable. In addition, a preferred second electrical connecting means for communicating between the electrical circuit means and the keyboard is a keyboard cable and preferred switch means is an analog switch.

Alternatively, an aspect of the present invention is a speech recognition apparatus operable with a host computer having two ports, with a keyboard comprising: a) an electrical circuit means, having speech recognition means, external to the host computer; b) a first electrical connecting means for communicating between the electrical circuit means and the first port of the computer; c) a second electrical connecting means for communicating between the electrical circuit means and the second port of the computer; d) a third electrical connecting means for communicating between the electrical circuit means and the keyboard; e) an optional noise canceling microphone for insertion into electrical circuit means for inputting voice commands to said electrical circuit means; f) a software application for installing in the host computer for configuring and training the voice commands with corresponding key-press information; g) the electrical circuit means further including a microcontroller for controlling transmission of the voice commands to the host computer and for receiving from the host computer the voice commands and the key-press information; and h) the electrical circuit means further including a switch means for allowing the microcontroller to send the key-press information to the host computer. Preferably, the electrical circuit means is a COM (RS-232C) port interface, Parallel port interface or USB port interface. The preferred first electrical connecting means for communicating between the electrical circuit means and the first port of the computer is a null modem cable for the COM (RS-232C) port; the centronics (Western Scientific, Inc.) cable for the parallel port device; and a high speed USB cable for the USB port. The preferred second electrical connecting means for communicating between the electrical circuit means and the second port of the computer is a keyboard patch and the preferred third electrical connecting means for communicating between the electrical circuit means and the keyboard is a keyboard cable.

In another aspect the invention provides a speech recognition system for computer games, having a host computer with a keyboard comprising: a) means for installing an electrical circuit board into the computer; b) means for communicating between the electrical circuit board and the computer; c) means for communicating between the electrical circuit board and the keyboard; d) means for training a user's voice commands to be recognized by the electrical circuit board; e) means for installing a software application into the host computer with pre-loaded commands and for configuring and training the pre-loaded commands with the user's own voice; f) means for assigning a corresponding key-press entry to the user's trained command for transmission to the electrical circuit board; and g) switch means for connecting and for disconnecting the keyboard from the electrical circuit board for sending the key-press entry to the host computer.

In yet another aspect, the present invention provides a method for allowing for programming a speech recognition system to recognize a user's own verbal commands for use in computer games, comprising the steps of: a) installing a ISA plug-in circuit board into the computer having at least three ports; b) connecting a computer to one port, a keyboard to the second port, and a microphone headset to the third port; c) installing a software application into the host computer with pre-loaded commands and having the ability to configure and train the pre-loaded commands with the user's own voice and assigning a corresponding key-press entry to the user's trained commands for storing in a computer file and for transmission to the plug-in circuit board; and d) providing switch means to connect and disconnect the keyboard from the electrical circuit board for sending the key-press entry to the host computer.

The speech recognition system is not limited to computer games, but can be used as a voice navigator in any application utilizing keyboard strokes, such as with voice verification systems, inventory verification and procurement systems, as an Internet browser, or in connection with Microsoft Office or AUTOCAD programs or the like.

Other objects, features and advantages according to the present invention will become apparent from the following detailed description of the illustrated embodiments when read in conjunction with the accompanying drawings in which corresponding components are identified by the same reference numerals.

BRIEF DESCRIPTION OF THE DRAWINGS

FIG. 2B is a side view of ISA plug-in circuit board inserted into an empty slot of the host computer, and FIG. 2C being a back view of the plug-in circuit board incorporated into the host computer;

DETAILED DESCRIPTION

Figure 1:
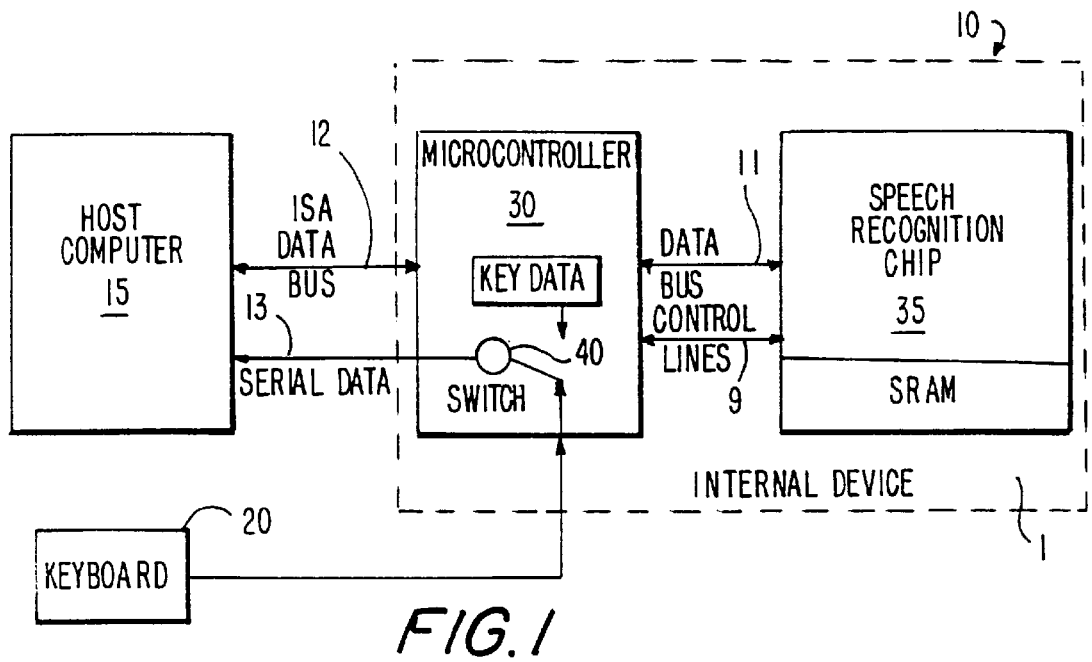
FIG. 1 illustrates a block diagram of an embodiment of the speech recognition system of the present invention having an internal device incorporated within the host computer and connected to the keyboard.

In FIG. 1, a block diagram of the preferred embodiment of the speech recognition system 10 of the present invention having an internal device 1 incorporated within the host computer 15. The internal device 1 is preferably an ISA plug-in circuit board 5 shown in FIG. 2A which is inserted within a host computer 15 by removing the case top (not shown) of the host computer 15 and installing the plug-in circuit board 5 into an empty ISA slot 2 as shown in FIG. 2B. If the host computer has no empty slot, an existing installed board must be removed and the plug-in circuit board inserted and secured. Therefore, the plug-in circuit board 5 is completely incorporated inside the host computer 15 as shown in FIGS. 2B–2C and the computer case cover is replaced (not shown).

Figure 2A:
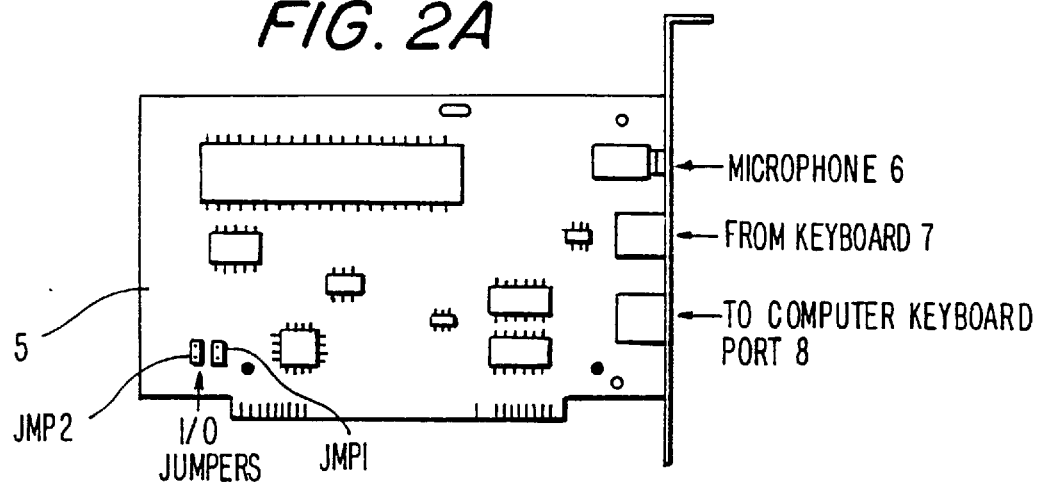
FIGS. 2A–2C illustrate the preferred internal ISA plug-in circuit board with FIG. 2A being a side view of the plug-in board.
Figure 2B:
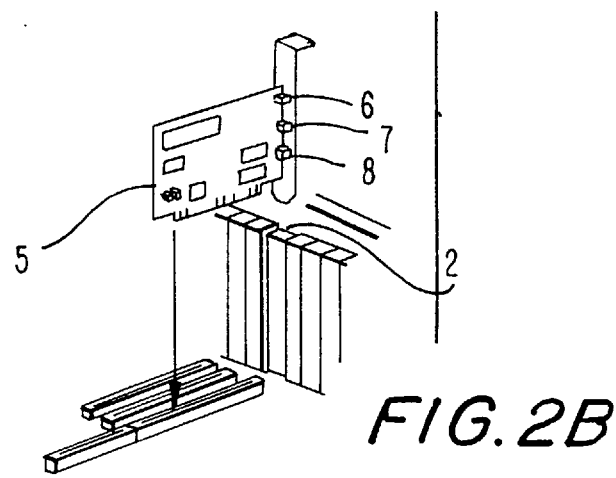

The ISA plug-in circuit board 5 is preferably comprised of an embedded microcontroller 30 and the installed speech recognition chip 35 with the components shown in FIG. 2A. The plug-in circuit board 5 communicates with the microcontroller 30 through the host computer computer's ISA data bus 12. The microcontroller 30 and speech recognition chip 35 through the data bus 11 and control lines 9 as shown in FIG. 1.

Figure 2C:
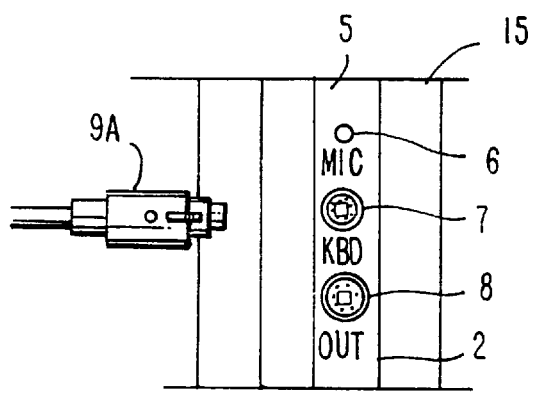

In FIG. 2C, the plug-in circuit board 5 contains three ports 6, 7, 8, preferably female ports or as a matter of design choice three male ports can be supplied, designated as "MIC" 6, "KBD" 7 and "OUT" 8, which are located on the outside of the back of the host computer 15 when installed as shown in FIGS. 2B–2C. "MIC" port stands for the input port which accepts the lead from the microphone headset or other sound input means. It is preferred that a noise canceling microphone headset be used. "KBD" port stands for the input from the keyboard cable 9. For AT-style keyboards, the adapter plug must be inserted into the end of the keyboard cable 9A shown in FIG. 2C prior to inserting into the "KBD" port 7. For PS/2-style keyboards, the adapter plug (not shown) must be inserted into the end of the patch cable (not shown) prior to inserting into the host computer's keyboard port. Accordingly, the host computer 15 with the ISA plug-in board 5 installed as shown in FIG. 2C creates a system having multiple connections 6, 7, 8, wherein connections 7, 8 are for conveying scan codes between the microcontroller 30 and host computer 15.

The keyboard 20 contains a keyboard patch cable (not shown) that has two ends, preferably male ends, but again female ends can be installed as a matter of design choice. The keyboard patch cable connects to the "OUT" port 8 as shown in FIG. 2C of the plug-in circuit board 5 to the keyboard port (not shown) located on the back of the host computer 15. The keyboard cable 9A from the keyboard 20 is inserted into an adapter plug (not shown) and into the "KBD" port 7 of the plug-in circuit board 5 as shown in FIG. 2C to establish the same serial data path 13 between the plug-in circuit board 1 and the host computer 15. ISA data bus path 12 as shown in FIG. 1 conveys the data and commands bidirectionally between the microcontroller 30 and the host computer 15. This serial data path 13 as in FIG. 1 conveys the key press assigned by the user to the trained verbal commands stored in the microcontroller 30.

A microphone headset (not shown) preferably a noise canceling microphone headset commercially sold by Andrea Electronics Corporation, (see PCT No. US95/14756), communicates with the host computer 15 and microcontroller 30 shown in FIG. 1 via the "MIC" port 6 on the back of the ISA plug-in circuit board 5. However, any sound input means can be utilized such as a tape recorder, sound card or the like.

Figure 8A:
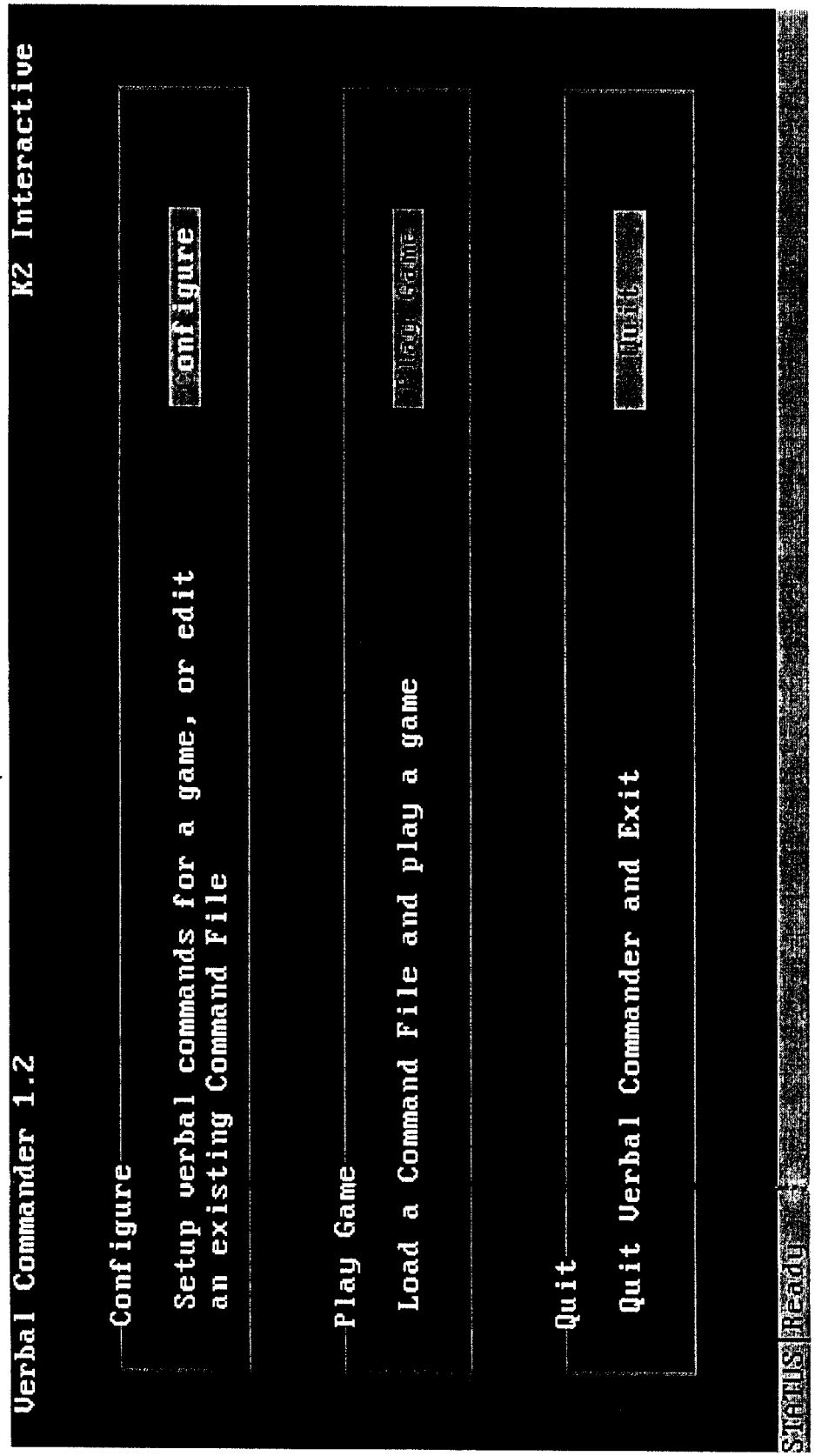
FIGS. 8A–E illustrate the interface between the software of the present invention and the user as displayed on the host computer.

After the system is assembled as shown in FIGS. 1–2, the system is configured by installing the software application. The software of the speech recognition system of the present invention, which is stored preferably on a 3.5" diskette, sends and receives pre-programmed commands from the host computer 15 to the microcontroller 30. After the software of the speech recognition system is installed on the default path of the hard drive or C: drive of the host computer with options available to change the default path and enter a new path, the setup program is run (70, FIG. 8A). Again, the default I/O address of the 218H I/O address is established or an alternate address can be selected. The software has at least twenty pre-loaded in an assortment of command files for the popular personal computer games, such as Descent™II, Quake™, Tie Fighter™, Dark Forces®, and Flight Unlimited™ to allow the user ready-to-play commands.

Figure 8B:
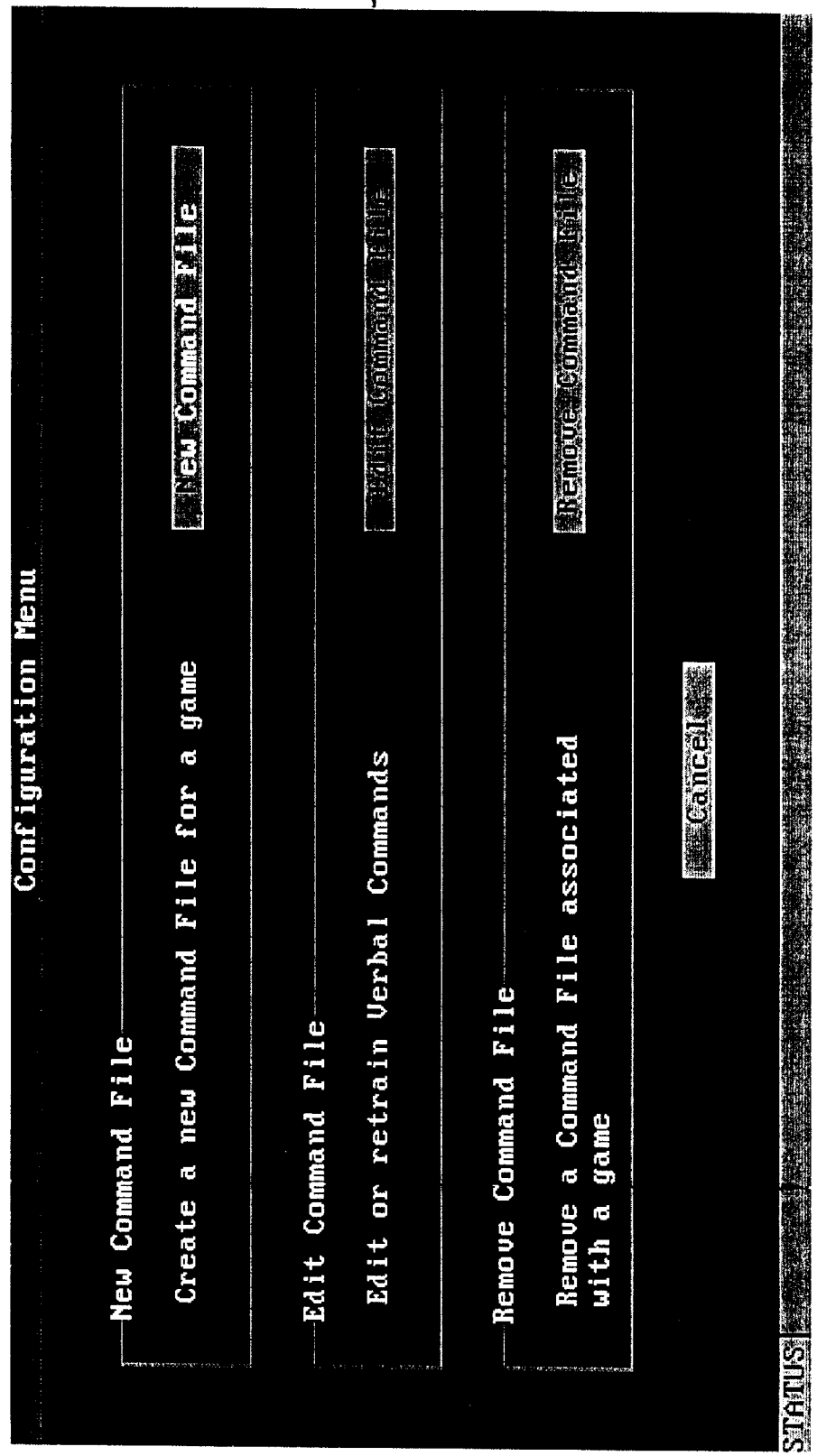
Figure 8C:
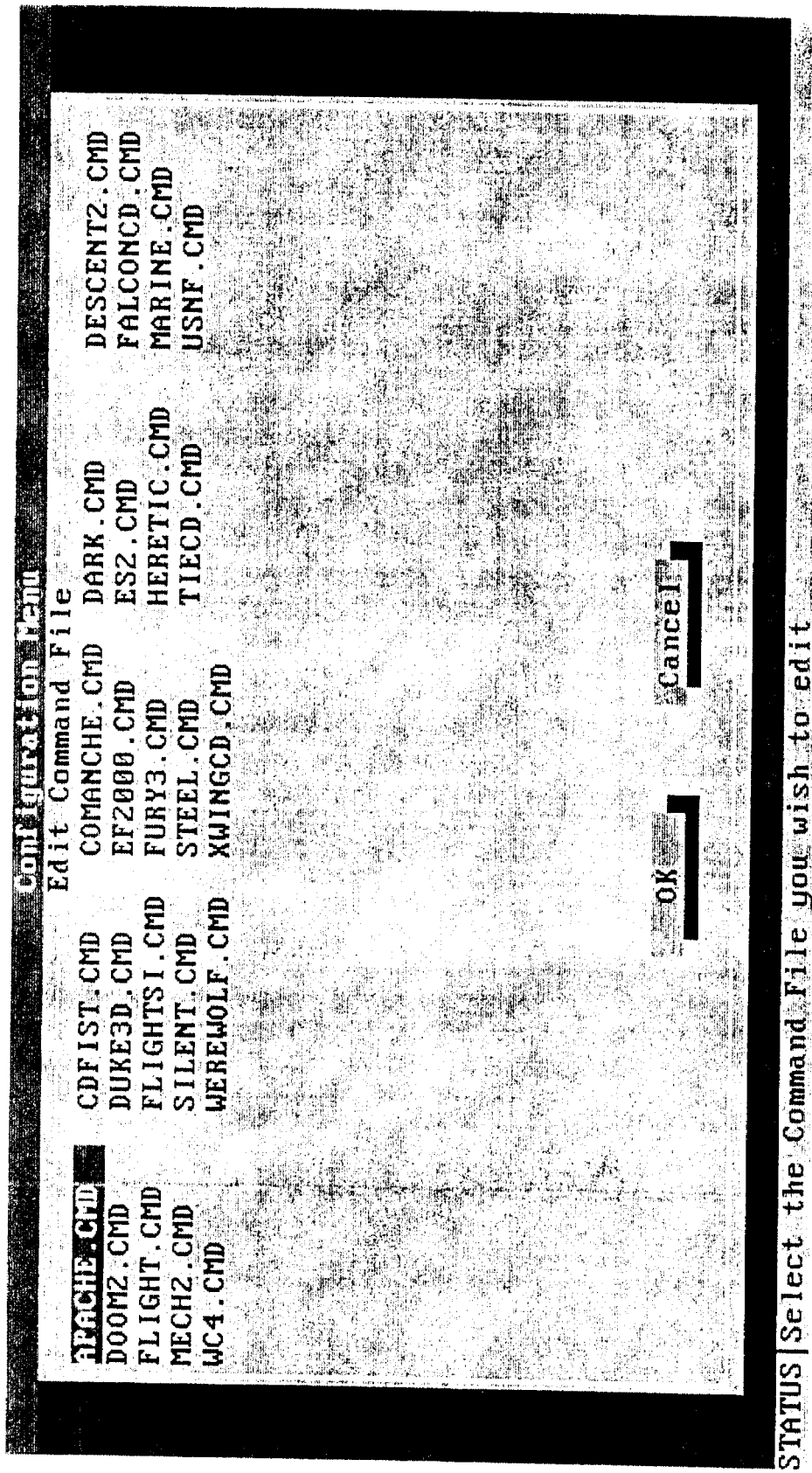
Figure 8D:
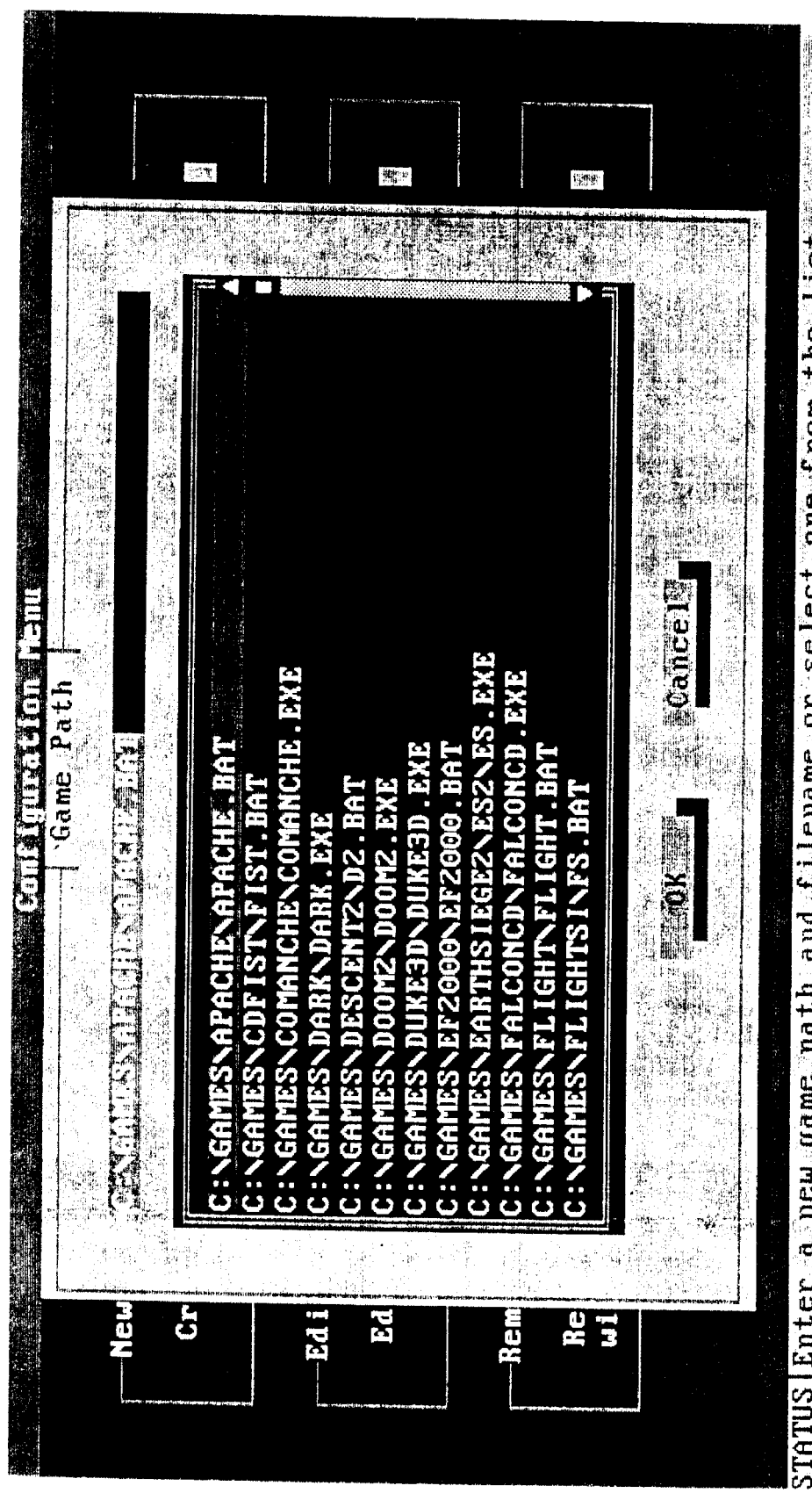

The next step is to review the Configuration Menu 80 to determine which edit command file to select as shown in FIG. 8B. From the "Edit Command File" window 80a, the user selects a command file from the following list of popular games 90 that the user wishes to configure from verbal commands as shown in FIG. 8C. After selecting a command file, the user links it to a game by selecting or entering the path from the game path window 100 as shown in FIG. 8D. The user than trains the verbal commands by placing the preferred microphone headset on the user's head and turning the switch on the headset to the "ON" position and adjusting the microphone boom to be proximate to the front of the user's mouth, for example, $\frac{1}{4}^{th}$ of an inch. It is preferred that all commands are spoken within the time frame of two seconds and in the same tone of voice that the user would use during actual game play, but other time frames and other tones of voices are obviously within the scope of the present invention. The speech recognition chip 35 installed in the plug-in circuit board 5 provides at least the following functions: RECOGNIZE, TRAIN, RESULT, UPLOAD, DOWNLOAD and RESET to allow the user to program new commands in the user's voice. The user than selects the edit menu to train the pre-configured commands and assigns key-presses to be associated with the command. At this stage, the user trains the command with the user's spoken words and the software assigns a key-press to correspond to the spoken command. For instance, if the user programs "GO", the user would then press the letter "V" or any other keystroke on the keyboard to define the command "GO", with the key-press entry to be sent at a later time to the microcontroller via the host computer's data bus.

Figure 8E:
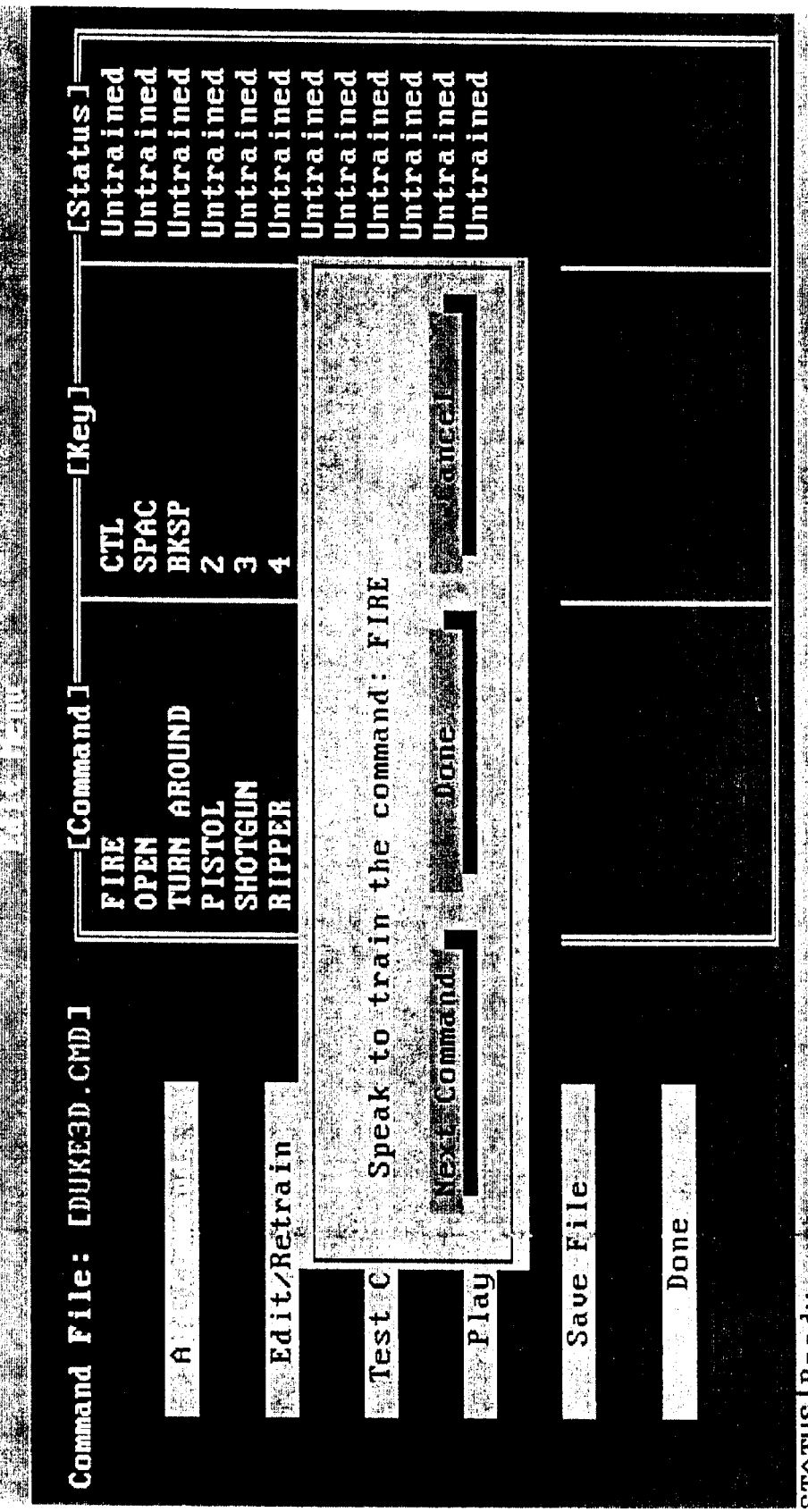

Once the command is trained, the corresponding speech data or spoken command of the user's voice is uploaded and stored on a fixed disk by utilizing the TRAIN and UPLOAD functions received from the speech recognition ship 35. After the desired commands have been trained, the commands are tested with a combination of the RECOGNIZE and RESULT commands with the user prompted to repeat each command to test the verbal commands. The user then saves the newly trained commands on the affixed disks or other suitable recording media. The user then selects the PLAY GAME option on the display of the host computer as provided by the software of the present invention to activate the game linked to the command file. A command file stores the verbal command and links them to the game and the new commands are added at the edit menu with up to twenty (20) commands capable of being configured for each game. The user then selects "ADD COMMANDS" 110 from the edit menu shown in FIG. 8E.

The user then types the exact word that will be spoken to initiate this command. After the command is typed, "OK" is pressed. The user then presses the keyboard key associated with that command, i.e. "1" and selects "OK" or presses "ENTER". The user will then be immediately be prompted to speak the trained verbal command. The software then prompts the user to select "next" to add the next command or "DONE" to stop entering commands.

The software then sends all key-press information to the microcontroller 30 through the ISA data bus path 12 shown in FIG. 1. When the autonomous recognition mode is initiated, the microcontroller performs speech recognition and the endless software loop of FIG. 4 is activated. That is, the switch 40 is in Position "A" 14 shown in FIG. 3 until a command is recognized. Once the command is recognized, the microcontroller 30 through the control line 13A flips the analog switch to Position "B" 16 to send key press data to the host computer 15. Upon completion of the key press transmission, the microcontroller 30 immediately changes the switch back to Position "A" 14 to await recognition of another spoken command.

When the switch 40 is in Position "A" 14, the keyboard 20 is directly connected to the host computer 15. When the microcontroller 30 needs to send scan codes, it flips the switch 40 to Position "B" 16 by using the control line 13A. In Position "B" 16, the microcontroller 30 is directly connected to the host computer 15 and permits the microcontroller 30 to transmit the scan codes. Immediately after sending the scan codes, the microcontroller 30 flips the switch 40 back to Position "A" 14, with the entire process taking a few milliseconds to perform and is transparent to the user.

Figure 3:
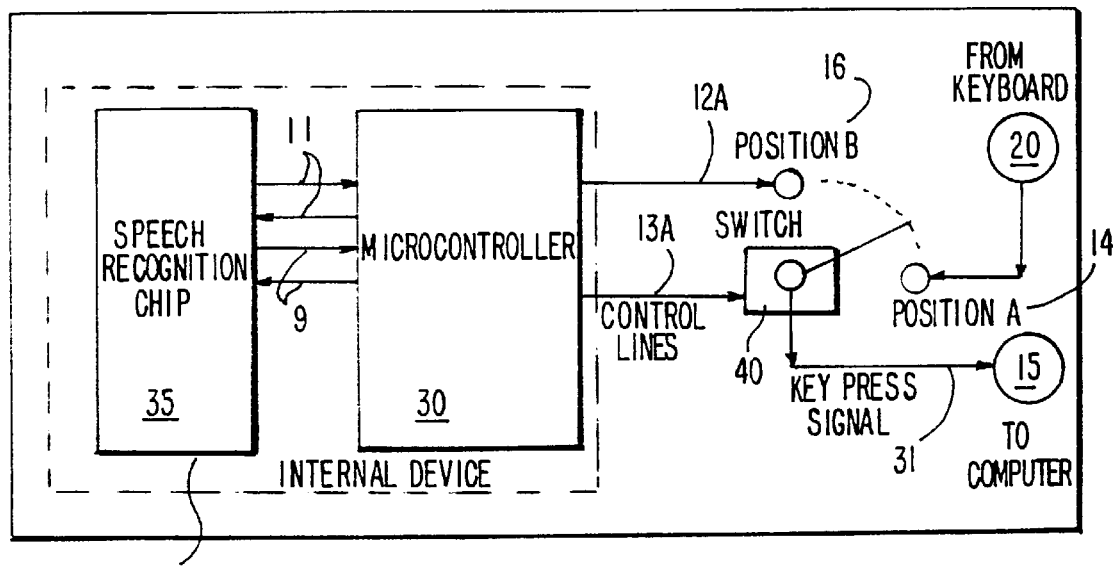
FIG. 3 illustrates a diagram of the keyboard connections in the embodiment of FIG. 1.
Figure 4:
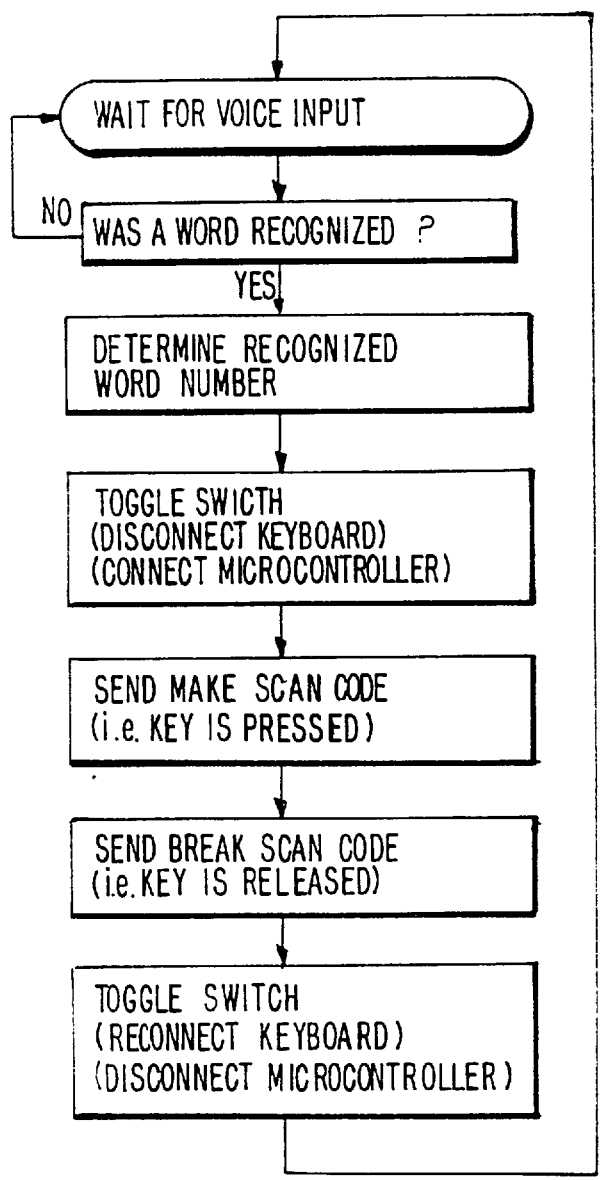
FIG. 4 shows a flowchart of the endless loop performed by the software of the speech recognition system of the present invention when the microcontroller is in the autonomous recognition mode.

In FIG. 3, the connections of the ISA plug-in board 5 to the keyboard 20 and to the host computer 15 is illustrated, wherein microcontroller 30 also performs the disconnecting and reconnecting of the keyboard 20 by control lines 13A from the serial data path 12A by use of the preferred analog switch 40 when sending the scan codes. The plug-in circuit board 5 sends scans codes, which is the user defined key-presses, to the host computer keyboard port based on speech recognition.

In FIG. 4, a flow chart shows the endless loop that the microcontroller 30 performs when in the autonomous mode. That is, the microcontroller 30 waits for the voice input from the user to determine the switch 40 position in FIG. 3 to see if the microcontroller 30 will be sending keystrokes commands to the host computer 15. If the word is recognized, the keyboard 20 is disconnected and the switch 40 is toggled from Position "A" 14 to Position "B" 16. In switch Position "B" 16, the microcontroller 30 is connected to the host computer 15 through the keyboard patch cable 12A for sending a scan code, which means that a key is pressed. When the key press is released, a break scan code is sent to the host computer 15 through the keyboard patch cable and immediately the microcontroller 30 moves the switch 40 from Position "B" 16 to Position "A" 14 for reconnecting the keyboard 20 via the key press signal path 31 and disconnecting the microcontroller 30 via the path 12A.

Once the computer game is over, the user returns to the software of the speech recognition system of the present invention, and the microcontroller and speech recognition chip are reset once the software is restarted.

Figure 5:
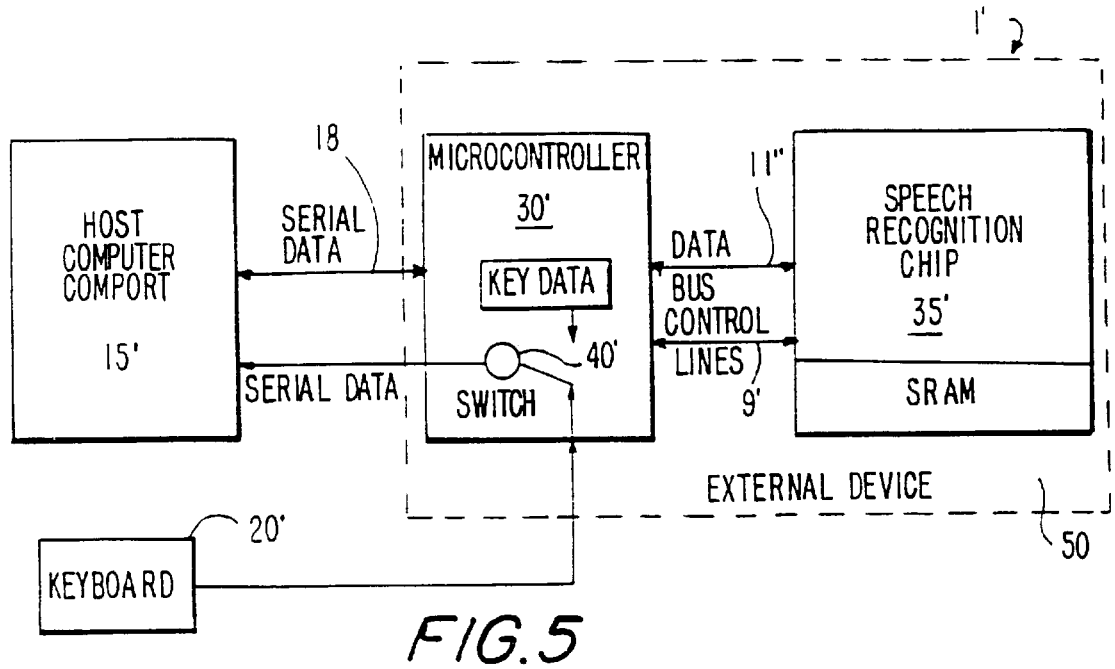
FIG. 5 illustrates a block diagram of an alternative embodiment of the speech recognition system of the present invention having an external COM port interface connected to the host computer and keyboard.

In FIG. 5, second embodiment of the speech recognition system 1' is depicted, wherein the internal device is replaced by an external device 50, preferably a serial COM (RS-232C) port interface. A preferred COM (RS-232C) port interface 50 is comprised of a microcontroller 30' and speech recognition chip 35' having data bus and control lines between them for sending and receiving voice commands in a similar fashion as described for the internal device in FIGS. 1–4. Data transfers between the host computer and the external device will be accomplished by way of the host computer's COM (RS-232C) port. The host computer's port interfaces include a connection for keyboard path cable information and for the external device. In fact, the way the microcontroller 30' interfaces with the speech recognition chip 35" and how the key press information is transmitted remain the same as the internal device disclosed above in FIGS. 3–4.

A null modem cable is needed between the DB-25 Data Bus Pin 25 or DB-9 (Data Bus Pin 9) pin connector (not shown) on the external interface and the DB-25 or DB-9 pin connector (not shown) on the back of the host computer. Data and control information will be sent through the RS-232C serial communication line between the external device 50 and the host computer 15'. The keyboard 20' is connected to the external device 50 in the same manner as the internal device depicted in FIGS. 2–3, with external device 50 also connected to the host computer's keyboard port in the same fashion as described in FIG. 2 for the internal ISA plug-in circuit board 5.

This external device 50 functions in the same manner as the internal ISA plug-in board depicted in FIGS. 1–4, except that the data transfers differs. Rather than using the personal computer's data bus 12 shown in FIG. 1, the host computer 15' performs its communication by way of the serial (RS-232C) port 18.

Figure 6:
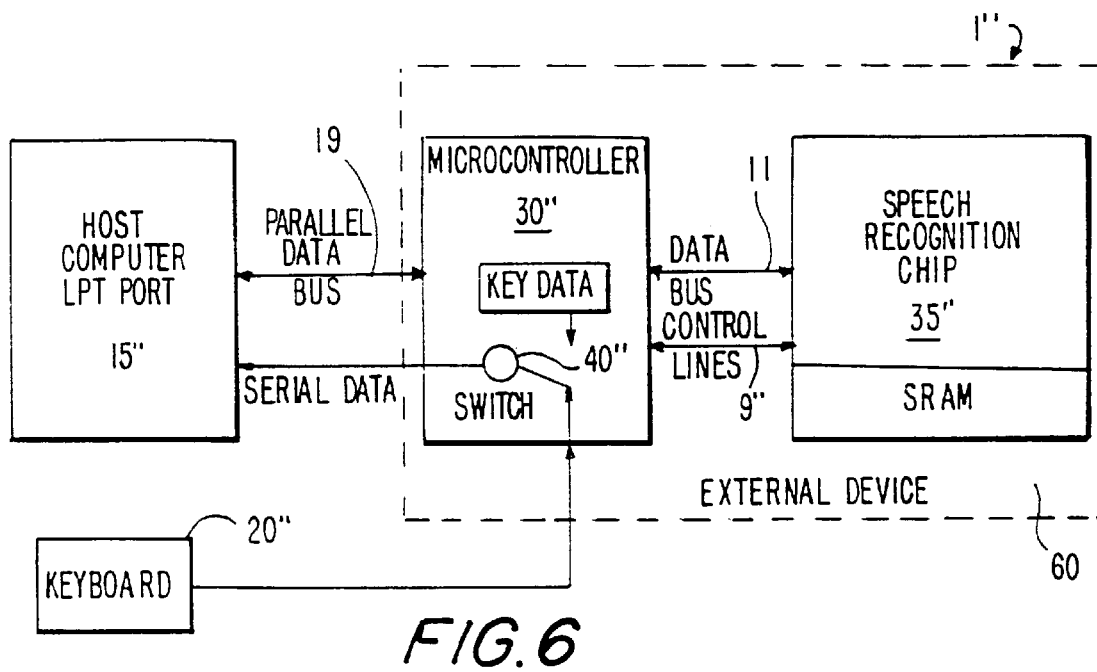
FIG. 6 illustrates a block diagram of an another alternative embodiment of the speech recognition system of the present invention having an external Parallel port device connected to the host computer and keyboard.
Figure 7A:
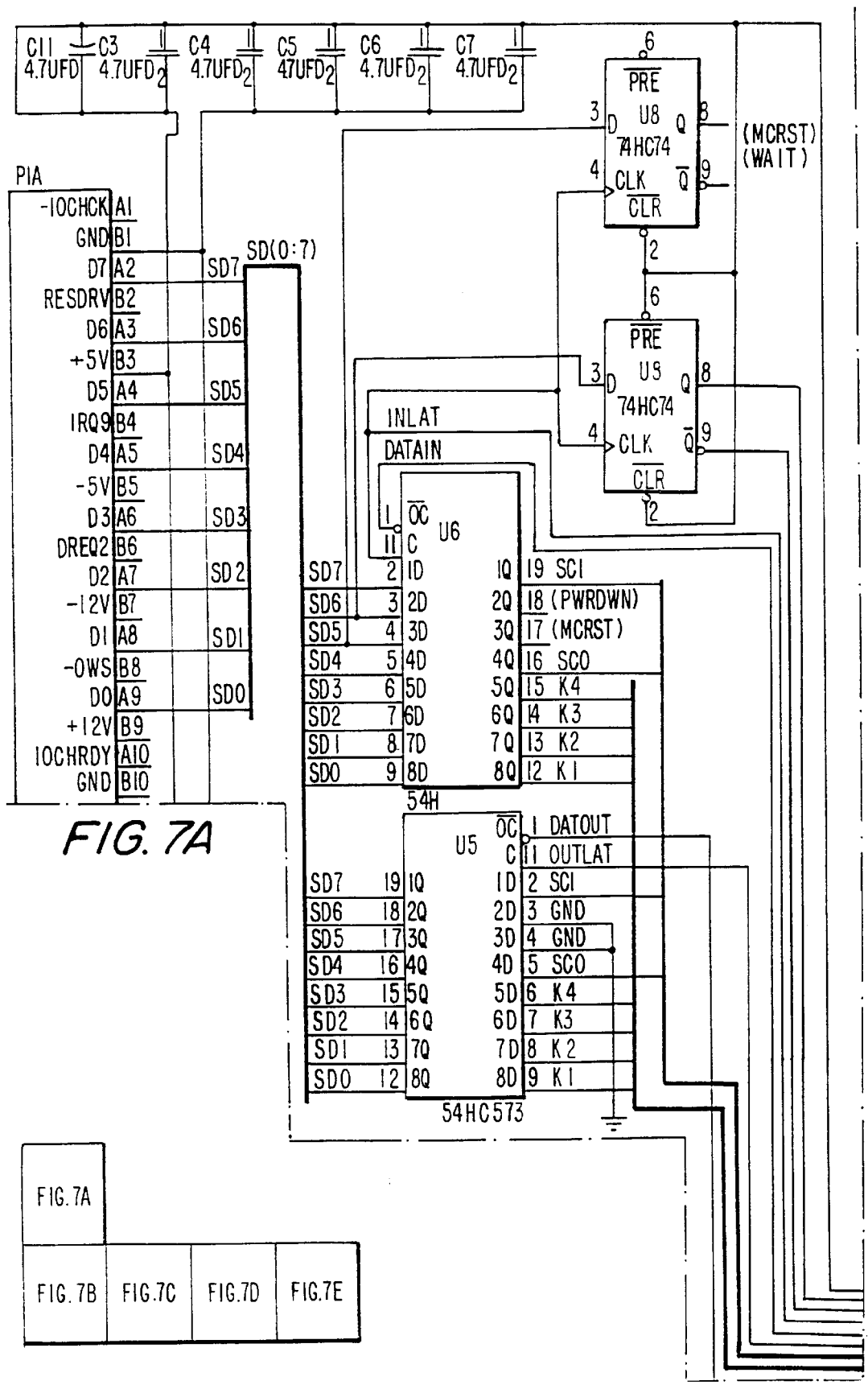
FIG. 7 is an electrical schematic of the speech recognition chip installed system in FIG. 1.
Figure 7B:
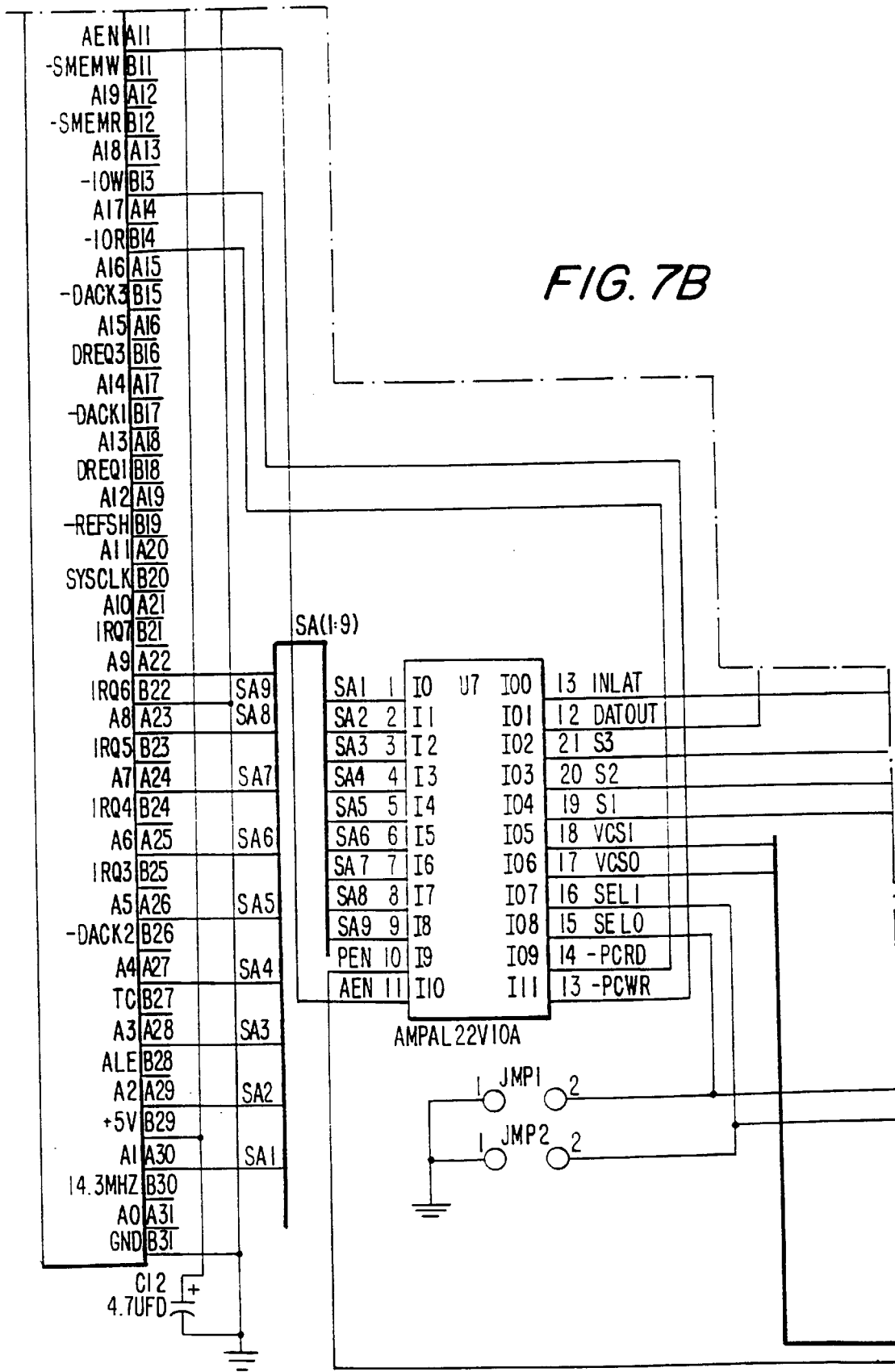
Figure 7C:
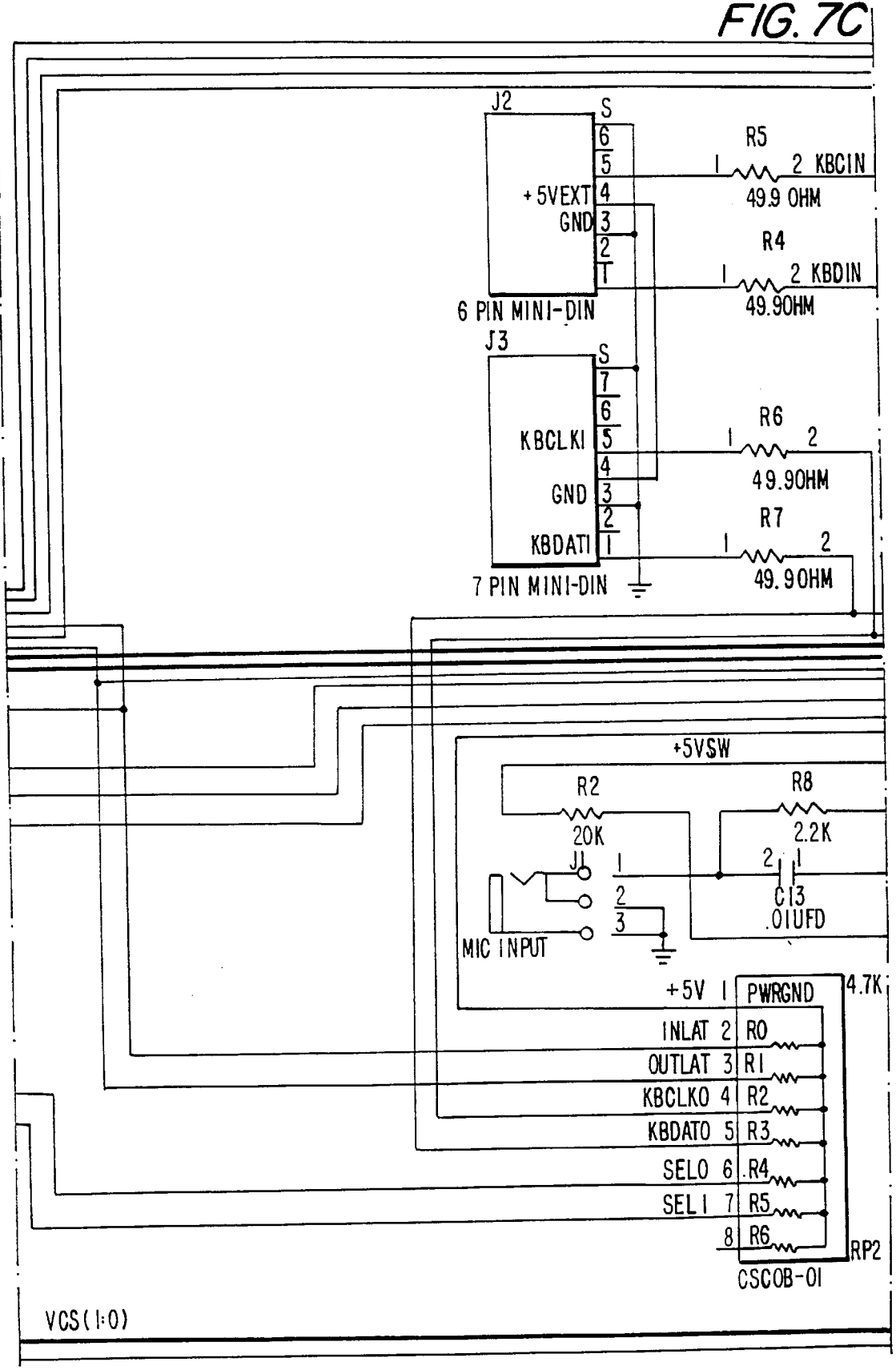
Figure 7D:
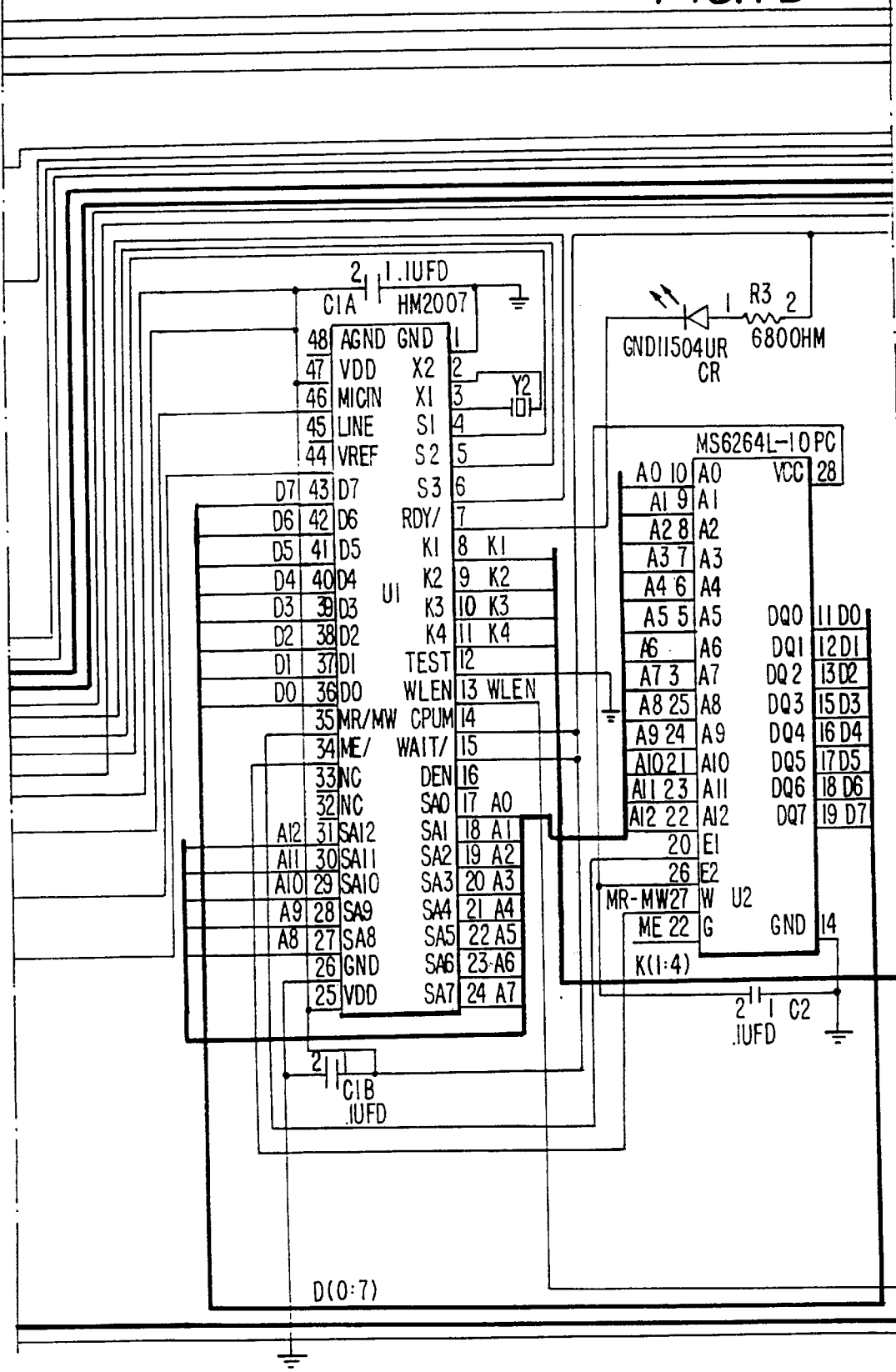
Figure 7E:
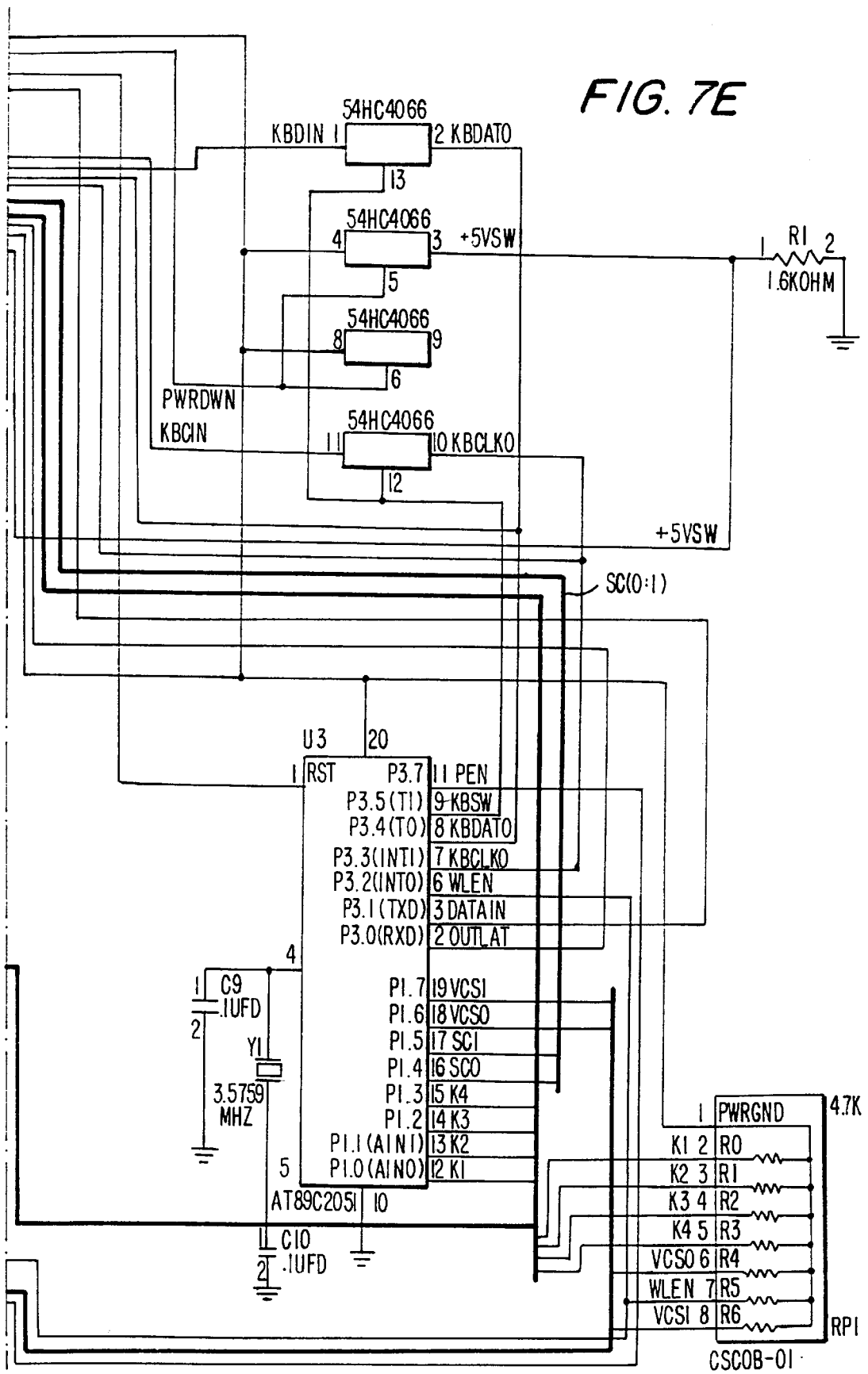

Likewise, in FIG. 6, a third embodiment of the speech recognition system 1" is depicted, wherein the internal device is replaced by a different external device 60, preferably a Parallel (printer) port interface. This external device 60 functions the same as the internal ISA plug-in board 1 and COM (RS-232C) port interface 50 described in FIGS. 1–5, except that the data transfer again differs. Just as described in FIG. 5, rather than using the personal computer's data bus 12 in FIG. 1, the host computer 15" performs its communication by way of a parallel/printer (centronics) port 19. The preferred Parallel (printer) port interface 60 is comprised of a microcontroller 30" and speech recognition chip 35" having the same data bus 11" and control lines 9" for sending voice commands as described for the internal device in FIGS. 1–4. In fact, the way the microcontroller 30" interfaces with the speech recognition chip 35" and how the key press information is transmitted again remains the same as for the internal ISA plug-in board and external COM port interface disclosed above in FIGS. 2–5.

The speech recognition system of the present invention is also adaptable with a universal serial bus ("USB") instead of the ISA plug-in circuit board 5 in FIGS. 2A–2C, the COM port interface or the Parallel port interface. The USB port (not shown) is located on the back of the host computer and all data, control and key-press information utilize the same high speed serial data path available on the USB ports without the need if toggling a switch to disconnect or connect the keyboard 20. In addition, the internal device preferably comprised of an ISA plug-in board as described in FIGS. 1–4, can be replaced with an alternative internal device having a universal serial bus USB port connected to one of the male ports on the back of the plug-in circuit board 5. The only difference would reside in the manner of sending key-press information, instead of using the serial data 13 path of the keyboard 20, the high speed serial data path of the USB port would be designated. The keyboard 20 can be either connected to the internal device 1 or another USB port (not shown) on the host computer 15. If the latter is chosen, the host computer 15 will be configured as if two USB keyboards were connected and using two separate USB ports on the host computer 15.

At no time in the speech recognition system described in FIGS. 1–6 is data transferred from the host computer through the keyboard port. The only transmission from the speech recognition system, which is the ISA plug-in circuit board 5 or the external port interfaces or devices 50, 60 to the host computer's keyboard port is key press data as described in FIG. 3.

FIG. 7 shows an illustration of the electrical schematic of the speech recognition chip utilized in the internal and external devices shown in FIGS. 1–6. The individual circuit components and pin numerals without reference designations depicted in FIG. 7 are connected as shown and will not be discussed further, since the connections and values are apparent to those skilled in the art and are not necessary for an understanding of the present invention.

The noise canceling microphone headset (not shown) included with the speech recognition system of the present invention utilizes omnidirectional microphones to cancel background or ambient noise. The headset coupled with the latest in high quality voice recognition technology advances computer control with voice to a reliability and user friendliness level equal to the keyboard and mouse. With the present invention, a voice recognition system is no longer confined to quiet closed door offices, but can be used in real-world noisy environments such as hotel lobbies, hospital emergency rooms, manufacturing facilities and noisy office areas.

The present invention is not so limited to computer games and may be used with numerous other software application utilizing keystrokes. Further, the invention can be utilized in voice recognition and/or verification systems such as inventory verification and procurement systems, for access to physical facilities, computer programs, computers or automatic teller machines and the like.

The speech recognition system described above is simple to install, requires minimal time, easy to configure, while enabling the user to greatly enhance game play or any other voice application and increase speech recognition accuracy. Thus, it is seen that the present invention provides a flexible speech recognition system which is adaptable to all languages and provides freedom to program and store the user's own commands for each game or software application or allow the user the option to utilize the pre-existing commands provided with the software included with the present invention.

Furthermore, although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. A speech recognition apparatus operable with a host computer having a keyboard comprising:
   a) an electrical circuit means, having speech recognition means, incorporated into the host computer;
   b) a first electrical connecting means for communicating between the electrical circuit means and the computer;
   c) a second electrical connecting means for communicating between the electrical circuit means and the keyboard;
   d) a microphone for inputting voice commands to said electrical circuit means;
   e) a software application for installing in the host computer for configurating and training the voice commands with corresponding key-press information;
   f) a microcontroller for controlling transmission of the voice commands to the host computer; and
   g) the electrical circuit means further including a switch means for allowing the microcontroller to send the key-press information to the host computer via said first electrical connecting means such that said key-press information is communicated by separate means from said voice commands communicated to said host computer.

2. The speech recognition apparatus according to claim 1, wherein the electrical circuit means is an ISA (Industry Standard Architecture) plug-in circuit board.

3. The speech recognition apparatus according to claim 2, wherein the first electrical connecting means for communicating between the electrical circuit means and the computer is a keyboard patch cable.

4. The speech recognition apparatus according to claim 1, wherein the second electrical connecting means for communicating between the electrical circuit means and the keyboard is a keyboard cable.

5. The speech recognition apparatus according to claim 4, wherein the switch means is an analog switch.

6. The speech recognition apparatus according to claim 1, wherein said microphone is a noise cancellation microphone which substantially cancels background noise from speech received by said noise cancellation microphone.

7. A speech recognition apparatus operable with a host computer having two ports, with a keyboard comprising:
   a) an electrical circuit means, having speech recognition means, external to the host computer;
   b) a first electrical connecting means for communicating between the electrical circuit means and the first port of the computer;
   c) a second electrical connecting means, separate from said first electrical connecting means, for communicating between the electrical circuit means and the second port of the computer;
   d) a third electrical connecting means for communicating between the electrical circuit means and the keyboard;
   e) a microphone for inputting voice commands to said electrical circuit means;
   f) a software application for installing in the host computer for configurating and training the voice commands with corresponding key-press information;
   g) the electrical circuit means further including a microcontroller for controlling transmission of the voice commands to the host computer via said first electrical connecting means; and
   h) the electrical circuit means further including a means for allowing the microcontroller to send the key-press information to the host computer via said second electrical connecting means such that said key-press information is communicated by separate means from said voice commands to said host computer.

8. The speech recognition apparatus according to claim 7, wherein the electrical circuit means is a (COM) (communications) port interface.

9. The speech recognition apparatus according to claim 7, wherein the electrical circuit means is a Parallel port interface.

10. The speech recognition apparatus according to claim 7, wherein the electrical circuit means is a Universal Serial Bus (USB).

11. The speech recognition apparatus according to claim 7, wherein the first electrical connecting means for communicating between the electrical circuit means and the first port of the computer is a null modem.

12. The speech recognition apparatus according to claim 7, wherein the second electrical connecting means for communicating between the electrical circuit means and the second port of the computer is a serial keyboard cable.

13. The speech recognition apparatus according to claim 7, wherein the third electrical connecting means for communicating between the electrical circuit means and the keyboard is a keyboard cable.

14. The speech recognition apparatus according to claim 7, wherein said microphone is a noise cancellation microphone which substantially cancels background noise from speech received by said noise cancellation microphone.

15. The speech recognition apparatus according to claim 7, wherein said first electrical connecting means is an RS-232 (serial) port.

16. The speech recognition apparatus according to claim 7, wherein the first electrical connecting means is a Universal Serial Bus (USB) port.

17. The speech recognition apparatus according to claim 7, wherein the first electrical connecting means is a communication (COM) port.

18. The speech recognition apparatus according to claim 7, wherein the first electrical connecting means is a parallel port.

19. The apparatus according to claim 7, further comprising a joystick which incorporates said electrical circuit means.

20. A speech recognition system for computer applications, having a host computer with a keyboard comprising:
   a) means for installing an electrical circuit board into the computer;
   b) first means for communicating between the electrical circuit board and the computer;
   c) second means for communicating between the electrical circuit board and the keyboard;
   d) means for training said electrical circuit board to recognize a user's voice commands;
   e) means for installing a software application into the host computer with pre-loaded key-press information and for configuring and training said electrical circuit board to associate the pre-loaded key-press information with the user's voice commands;

f) means for assigning a corresponding key-press entry to the user's trained commands; and g) switch means for connecting and for disconnecting the keyboard from the electrical circuit board for sending the key-press entry to the host computer via said first means such that said key-press information is communicated by separate means from said user's voice commands sent to/from said computer.

21. A method for programming a speech recognition system to recognize a user's own verbal commands for use in computer games, comprising the steps of:

a) installing a industry standard architecture (ISA) plug-in circuit board into the computer having at least three ports;

b) connecting a computer to one port, a keyboard to the second port, and a microphone headset to the third port;

c) installing a software application into the host computer with pre-loaded commands and having the ability to configure and train the pre-loaded commands with the user's own voice by assigning a corresponding key-press entry to the user's trained commands for storing in a computer file and for transmission to the plug-in circuit board; and d) providing switch means to connect and disconnect the keyboard from the electrical circuit board for sending the key-press entry to the host computer via communication means such that said key-press entry is communicated by separate means from said pre-loaded commands sent from said computer.

* * * * *